(No Model.) 3 Sheets—Sheet 2.
H. M. FULWIDER.
MACHINE FOR AUTOMATICALLY WEIGHING GRAIN.
No. 395,561. Patented Jan. 1, 1889.
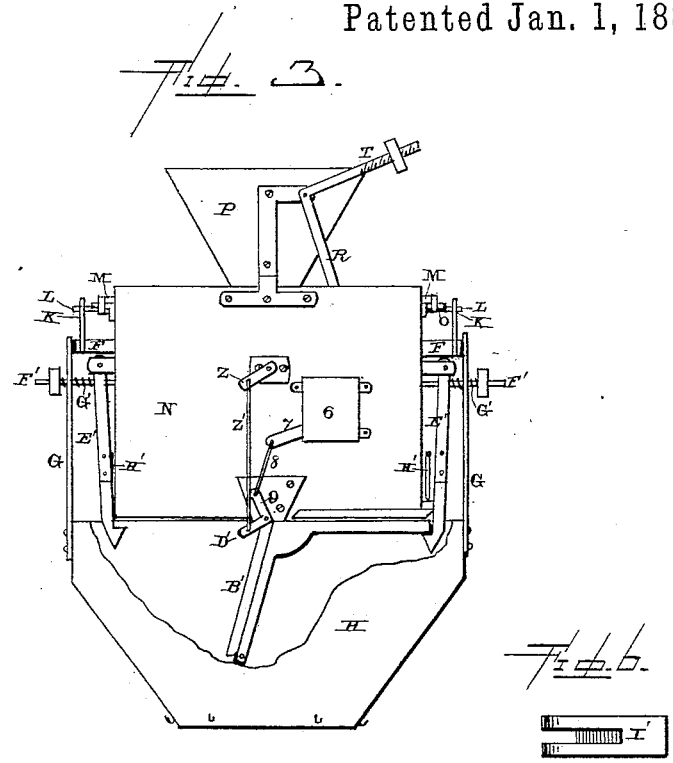
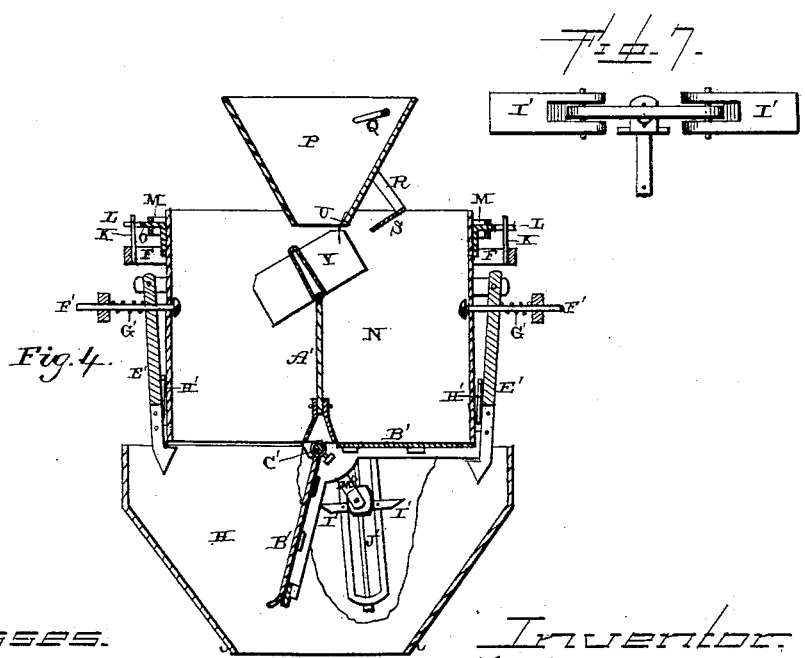
Witnesses.
L. L. Gardner
L. L. Lehmann
Inventor.
H. M. Fulwider,
per
F. A. Lehmann,
atty.

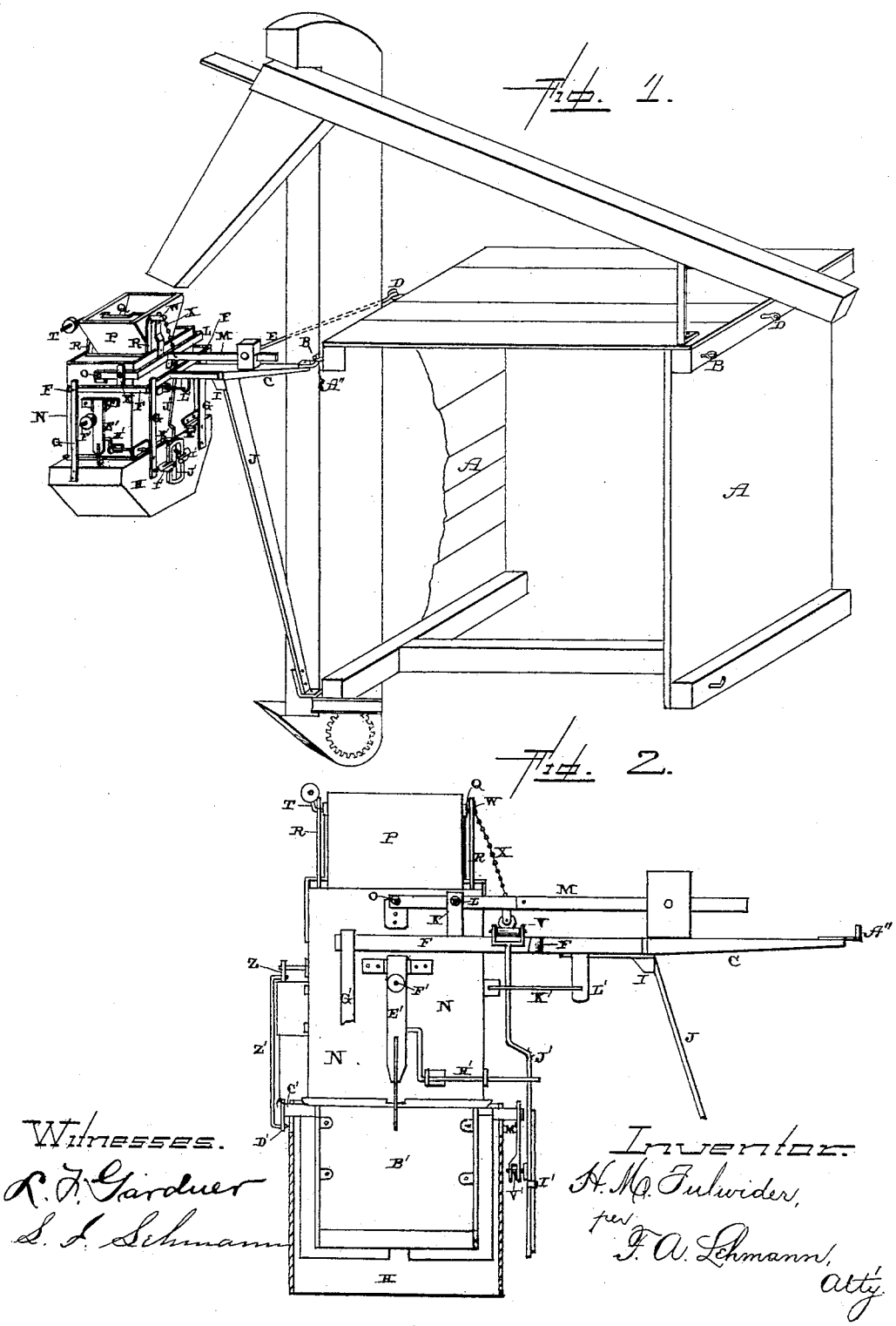

(No Model.) 3 Sheets—Sheet 3.

H. M. FULWIDER.
MACHINE FOR AUTOMATICALLY WEIGHING GRAIN.

No. 395,561. Patented Jan. 1, 1889.

Witnesses:
E. P. Ellis,
Jev Garner

Inventor:
H. M. Fulwider,
per F. A. Lehmann,
atty.

UNITED STATES PATENT OFFICE.

HORACE M. FULWIDER, OF REDMON, ILLINOIS.

MACHINE FOR AUTOMATICALLY WEIGHING GRAIN.

SPECIFICATION forming part of Letters Patent No. 395,561, dated January 1, 1889.

Application filed May 22, 1888. Serial No. 274,876. (No model.)

*To all whom it may concern:*

Be it known that I, HORACE M. FULWIDER, of Redmon, in the county of Edgar and State of Illinois, have invented certain new and useful Improvements in Machines for Automatically Weighing Grain; and I do hereby declare the following to be a full, clear, and exact description of the invention, such as will enable others skilled in the art to which it pertains to make and use it, reference being had to the accompanying drawings, which form part of this specification.

My invention relates to an improvement in machines for automatically weighing grain;
and the objects of my invention are to produce a machine which can be attached directly to the side of a thrashing-machine and to be used in connection with an elevator, which is preferably of the well-known chain-and-bucket class, provided with a two-way spout at its upper end, so that as rapidly as the grain is thrashed and cleaned it may be elevated and spouted into the weigher and weighed and delivered loosely or sacked in a wagon.

Figure 5:
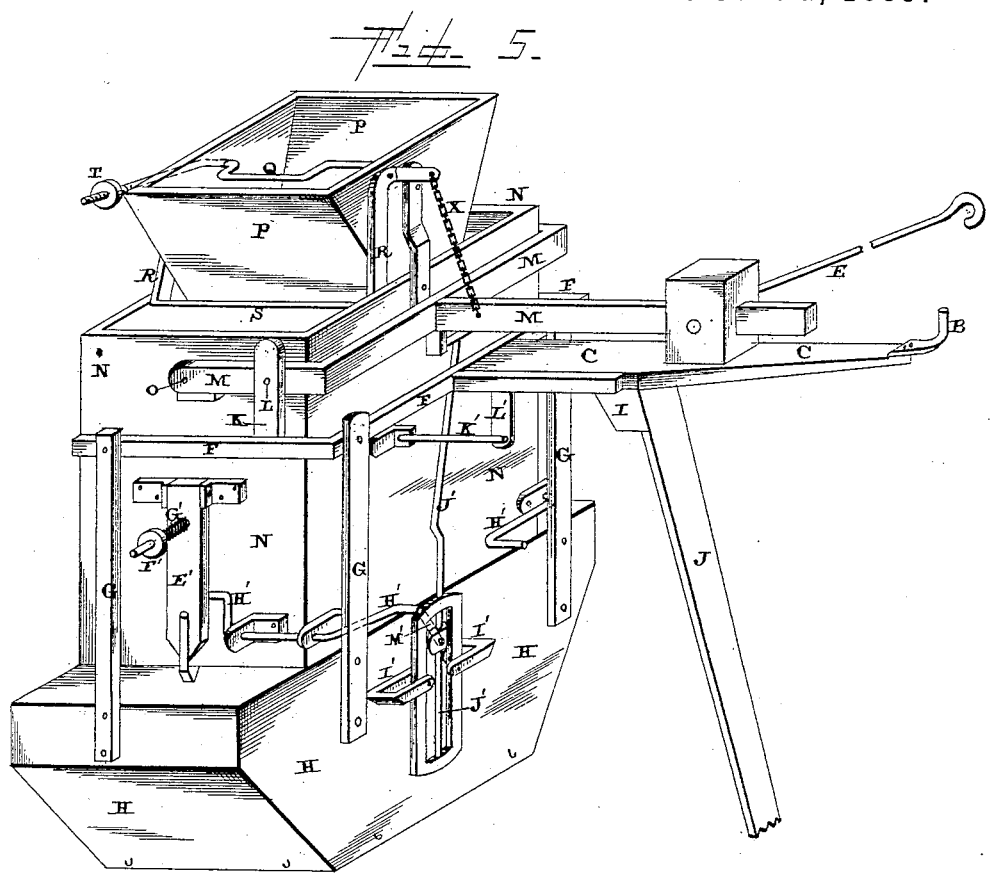
Figure 8:
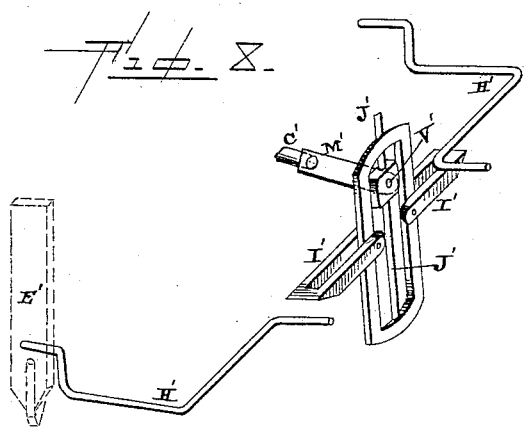

Figure 1 is a perspective view of my grain-measuring machine attached to the side of a thrashing-machine with the front and a portion of the side of the thrasher cut away. Fig. 2 is an end view of the weighing mechanism detached with half of the lower hopper cut away. Fig. 3 is a side elevation of a machine embodying my invention with a portion of the lower hopper cut away, showing the exact position of the two bottoms. Fig. 4 is a sectional view with a portion of the lower hopper cut away on opposite side, showing trip-finger and rack plainly. Fig. 5 is a perspective of a machine which embodies my invention complete, made upon a larger scale than is shown in Fig. 1. Figs. 6 and 7 are detail views of the rack and the trip-fingers connected thereto. Fig. 8 is a perspective of the trip-rod, the rack, and the trip-fingers connected thereto.

A represents the side of the thrashing-machine, which is provided with a suitable eye, B, for the projection A″ upon the support C to catch in, and an eye, D, for the brace-rod E to catch in, this rod E being loosely fastened at its other end to the edge of the support C.

To the inner end of the support C are secured the angular iron bars F, to which the uprights G, which support the lower hopper, H, secured to their lower ends, are fastened. Upon the under side of this support C is secured a cleat, I, against which the upper end of the brace J catches for the purpose of holding the support C in a horizontal position. The lower end of the brace J is hooked upon a suitable projection which extends from the side of the thrashing-machine.

The entire machine is supported in position by the support C and the brace J, and these parts are prevented from having any lateral movement by the brace-rod E, one end of which is hooked in an eye on the support C and the opposite end in a suitable eye on the thrasher.

To the angular iron bars F are secured the bearings K, and in these bearings the knife-edged pivots L of the scale-beam M catch. The outer portion of the scale-beam, where the weight is placed upon it, is made perfectly straight, but the inner portion is made U-shaped, so as to extend around opposite ends of the box N, which is provided with the knife-shaped journals O, which catch in suitable bearings made in the inner end of the scale-beam. This beam M turns upon its pivots L, and as the outer end upon which the weight is placed rises or falls the box N rises or falls correspondingly, because the measuring-box is supported by its pivots O, that work in the inner end of the scale-beam.

Secured by means of brackets, in the upper part of the box N, is the hopper P, in the upper portion of which is journaled the U-shaped crank-shaft Q, to the ends of which are secured the two rods R, to the lower end of which the cut-off S is secured. The partially-revolving shaft Q is made U-shaped, as shown, so that it will not extend straight across the hopper P and interfere in any manner with the discharge of the grain into the hopper, and so that its bend will act as a weight to assist in closing the cut-off S. Secured to one of the rods R is a screw-threaded bolt, T, carrying a large nut, which is adjustable and serves as a weight to close the cut-off S. This nut is made adjustable, in order that the cut-off may be adjusted properly to act in any and all kinds of grain, whether damp or dry.

In order to prevent any grain from catching between the bottom of the hopper P and the cut-off, and thus interfere with the closing of the cut-off, a piece of cloth, leather, or other material, U, is secured to the lower edge of the hopper P, and as the cut-off closes it moves this material U across the bottom of the hopper, so as to prevent the grain being caught by the cut-off. Where no material U is used the action of the cut-off is not always certain, owing to its action being interfered with by grain being caught between it and the hopper as it closes.

To the upper end of one of the rods R, on side of hopper next to thrasher, is a crank or bend, W, and to this crank is secured a chain, X, and the lower end of this chain is secured to the scale-beam M. As the measuring-box N sinks, carrying the hopper P with it, the chain X becomes slackened, and then the weighted rod T and the weight of the central portion of the crank-shaft Q instantly closes the cut-off S and stops all flow of grain into the lower box, N. When the grain is discharged from the box N, that part of the scale-beam that carries the sliding weight drops and the measuring-box N rises, carrying the hopper P with it, and as the hopper rises and the scale-beam descends the chain X exerts a downward pull upon the crank W, and thus causes the rods R to instantly open the cut-off S, to allow the flow of grain to again take place through the upper hopper, P, into the box N.

Pivoted in the central upper portion of the measuring-box N is the deflector Y, which is placed upon the shaft, which extends across the box from the side of the other, and which has the crank Z secured to one end. Guiding-flanges are formed upon each end of this deflector Y, so as to guide the grain into the proper compartment of the box N, and prevent it from running over the edge, as would otherwise be the case. This deflector Y serves to direct the flow of grain into first one compartment and then the other, and it is shifted each time that the angular bottoms are operated by the weight of the grain.

The box N is divided into two compartments by the central partition, A', which is forked at its lower end, in order that the partially-revolving shaft C', which carries the two bottoms, may work freely. Were this partition made straight, as in other machines of this class, and not forked, the grain would sometimes catch between it and the shaft C', that carries the two bottoms, and clog its action, and therefore prevent it from snapping up into the proper position to form a bottom on the side required.

The two compartments N have their bottoms closed alternately by the two angular bottoms B'. The bottoms B' are made of sheet-iron, in order that they may not be affected by damp weather or warped by the sun. If they were made of wood, as in some machines of this class, they would sometimes be affected by the weather, which would prevent the latch E' from catching them, as required.

The two bottoms are each riveted to a cast piece, which is secured to each end of the shaft C' by means of set-screws, in order that they may be adjusted to fit the bottom of box N, and then locked in place. These two cast pieces each have two arms which stand at about right angles to each other, and when one bottom is being made to close the bottom of one compartment the other hangs vertically inside of the lower hopper, H. The outer edge of the bottoms B' is turned upward, as shown, to prevent any grain from escaping between the lower edge of the box N and the edge of the bottom, as would otherwise be the case.

The partially-revolving shaft C', which carries the two bottoms B', is provided with a crank, D', at one end, and the cranks D' and Z are connected together by the rod Z', which causes the deflector Y to shift each time that the partially-revolving shaft C' is moved on its axis by the movement of either of the bottoms B' from the weight of the grain upon them. Each of the two bottoms has a slot cut in the upwardly-bent portion directly where the latch catches, and this slot is made so that the latch E' will not strike the bent-up portion, but will catch on the cross-piece that the bottom is riveted to. The latches E' are pivoted to the end of the box at their upper ends in suitable ears, which are made fast to the box N, and these latches are made automatic in their operation by means of the bolt F', which passes through it, the box, and the spring G', which is placed upon the bolt. A nut upon the outer end of this bolt serves to tighten or loosen the tension of the spring, as desired. As soon as the desired amount of grain has run into the compartment of the box N which has its bottom closed, the latch on that side is operated and the bottom drops downward, not only from its own gravity, but from the weight of the grain upon it, and its movement is sufficiently forcible to cause the bottom which was hanging vertically to snap up into position. The weight of the grain causes these bottoms to automatically operate and to close the lower outlet of first one compartment and then the other.

Each one of the latches E' is operated by the bent rods H', which are journaled upon the end of the box N, and has one end to catch behind the latch E' and the other end to extend along the rear side of the box N across the line of travel of the trip-fingers I', which are pivoted to the frame that is made fast to the moving pendulum-rod J', which is suspended on the scale-beam M by means of a two-way knuckle, V. The trip-fingers I' are slotted, and in this slot is fitted the frame on the rod J', and as the upper part of this slot is longer than the lower one it will strike in its slot on the frame when it is in a horizontal position. The upper part of this slot is made long enough to allow the trip-finger I' to rise in nearly a vertical position, for when the rod and the trip-fingers are shifted from one side to the other the finger I' is thrown above the bent rod H', and when the trips descend as the scale-beam does one of the fingers I' strikes the outwardly-bent portion of the rod H', which is in the line of travel of the fingers I'. This finger is moved on its pivot and rises up against the frame it is pivoted to until it passes below the bent rod H', after which it drops downward into a horizontal position by its own weight, to act upon the rod H' when required. As the box N and the rod J' are fastened to opposite sides of the pivots K, upon which the scale-beam turns, the rod J' and the box N always move in opposite directions. When the box is descending from the weight of the grain upon it, the rod J', carrying the tripping-fingers I', is rising, so as to act upon one of the bent rods H' to release one of the bottoms B', which is at that time closing one of the compartments in the box N.

In order to prevent the box N from having any lateral play in its vertical movements, the rod K' is fastened to it at one end, and the other end of the rod K' is fastened to the hanger L', which extends downward from the under side of the support C. Secured to the opposite end of the shaft C' from the crank D' is the crank M', which is forked at its lower end, and in these forks are made two bearings, in which is journaled a shaft, V', provided with two guiding-eyes, and through these eyes the rod J' passes. If only one eye were used, it would sometimes bind and clog its action. Each time that the partially-revolving shaft C' is moved by one of the bottoms B' this shaft turns the crank M' just far enough to that side of the box so that the pivoted tripping-fingers I' upon that side will be moved under the end of the bent rod H', which is to be brought into play in order to trip the latch supporting the bottom then in use. Were it not for this crank M' the rod J' would move vertically and neither of the tripping-blocks I' would be brought up against the bent rods H', but would pass between them. By the use of the crank the trips are shifted from side to side as the bottoms are operated by the weight of the grain upon them.

Prior to starting the thrasher the sliding weight on the scale-beam M is set for the desired quantity to be measured, and is then locked in place by means of a set-screw. A chain belt is passed around the sprocket-wheel on the lower end of elevators in the usual manner, and around a similar wheel that may be clamped to any suitable pulley on the thrasher. When the thrasher starts, the elevators start with it and carry the grain upward, spout it into the hopper P of the scales, and from the hopper P the grain is directed into one of the compartments N by means of the deflector Y. When the quantity the scales are set for runs in the compartment N, the scale-beam M tips slightly. This slackens the chain X and the cut-off S instantly closes, shutting off the supply of grain from the receptacle N. The supply is continually being spouted from the elevator into the hopper P as the measuring-box is discharging its load.

As the box N descends, which is now overbalanced by the grain in it, the rod J', carrying the frame and trip-fingers I', is brought upward and one of the fingers I' comes directly under the bent rod H', and this motion upward is sufficiently forcible to operate the latch E', allowing the bottom of the filled compartment to drop down into a vertical position, and the opposite one is now snapped up into a horizontal position, and is held in place by the latch E' until again tripped. As the bottoms B' drop, the rod J' and its tripping-fingers are shifted, bringing one of the fingers I' above the rod H'. As the rod J' descends, the finger I' strikes the rod H, moves on its pivot and passes below it, and returns to a horizontal position by its own weight. As the grain is discharged from the box N, it drops into the lower hopper, H, which has a contracted discharge at its lower end, and which is provided with hooks for bags to hang on. The end of the scale on which the weight is placed drops downward as the grain is discharged. This motion exerts a pull on the chain X and opens the cut-off S, allowing the grain to run again into the receptacle N.

As it will be necessary to register the number of times the measurer dumps, a suitable register, 6, may be placed on the side of the box N. The register 6 should be provided with a lever, 7, which is connected to a rod, 8. The lower end of the rod 8 is connected to the crank 9, which is a part of the crank D', which is secured to one end of the shaft C'; hence it will be seen that the lever on the register will receive an upward and a downward movement each time the bottoms are operated.

The number of times the measurer dumps is indicated by the register, and when this is multiplied by the number of pounds the scale is set, for the product will give the total amount measured.

Having thus described my invention, I claim—

1. The combination of the scale-beam M, pivoted in suitable bearings connected to the support C, with the box N, which is pivoted upon the ends of the scale-beam, the automatically-operating bottoms for closing the lower ends of the compartments in the box N, catches for supporting the bottoms in position, tripping-rods for operating the catches, and pivoted blocks connected to the rod which extends downward from the scale-beam, substantially as described.

2. The combination of the scale-beam pivoted in suitable bearings, the box N, divided by a partition into two compartments, the hopper, a bent shaft which passes through the upper portion of the hopper, a weight connected to the shaft, rods connected to the shaft and to the cut-off which closes the bottom of the hopper, and a chain connected to a crank on the shaft and to the scale-beam, substantially as specified.

3. The combination of the hopper, the bent partially-revolving shaft placed therein, a weight connected to this shaft, a cut-off operated by the shaft, and a chain connected to the shaft and to the scale-beam, substantially as specified.

4. The combination of the hopper, the box N, divided by a vertical forked partition into two compartments, the shaft C', having the bottoms B' secured thereto, a crank, D', upon the end of the shaft, the connecting-rod, the crank Z', and the deflector Y, substantially as shown.

5. The combination of the box N, divided by a vertical partition into two compartments, the shaft C', the bottoms B', connected to the shaft, the catches E', the rods H', for operating the catches E', the vertically-moving rods, and the automatically-operating tripping-blocks pivoted to the vertically-moving rod secured to the scale-beam, substantially as described.

6. The combination of the box N, divided by a vertical partition into two compartments, the shaft C', the bottoms B', connected to the shaft, the crank M', secured to one end of the shaft and provided with suitable guiding eyes or loops, the vertically-moving rod J', connected to the scale-beam, the tripping-blocks secured thereto, the bent rods H', and the catches E', substantially as set forth.

In testimony whereof I affix my signature in presence of two witnesses.

HORACE M. FULWIDER.

Witnesses:
EDWARD WALLS,
M. V. BARR.